July 10, 1934.  A. M. MATZ  1,965,984
FOLDING EGG CRATE
Filed March 2, 1934   2 Sheets-Sheet 1
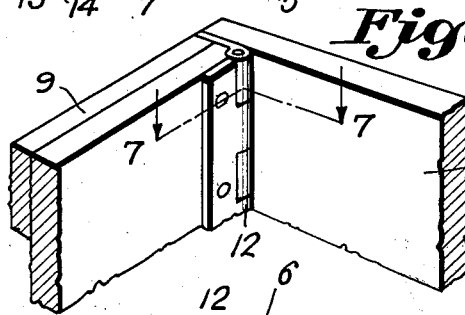
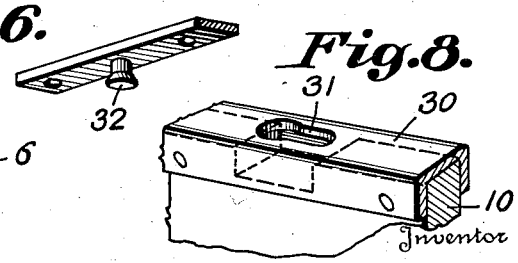

July 10, 1934.  A. M. MATZ  1,965,984
FOLDING EGG CRATE
Filed March 2, 1934  2 Sheets-Sheet 2
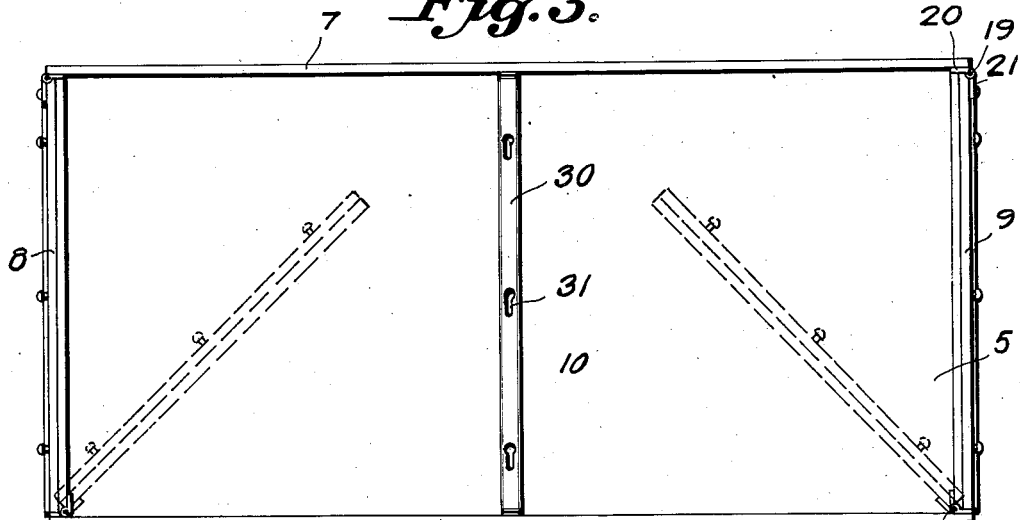
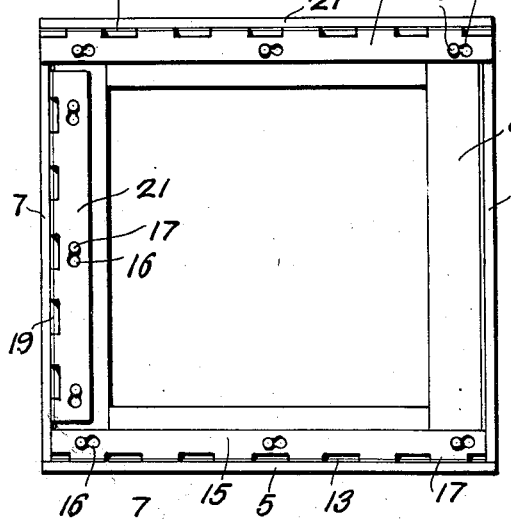
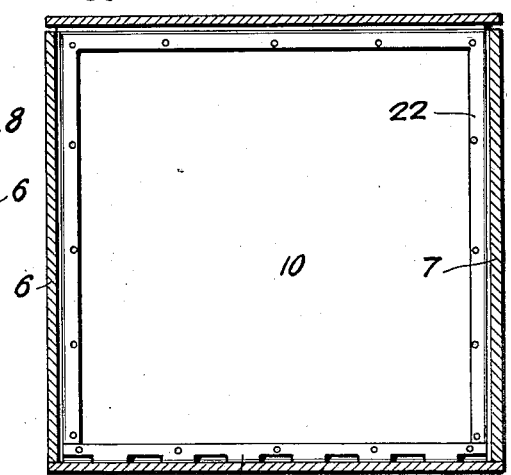
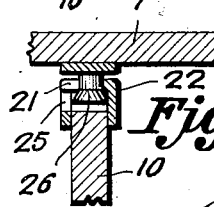
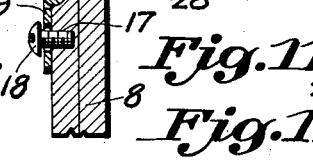
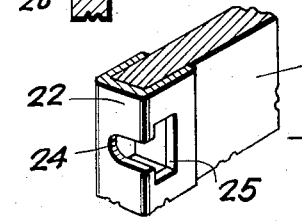
Inventor
Adeline M. Matz
By
Attorneys Patented July 10, 1934

1,965,984

UNITED STATES PATENT OFFICE 1,965,984

FOLDING EGG CRATE

Adeline M. Matz, Valley City, N. Dak.

Application March 2, 1934, Serial No. 713,629

2 Claims. (Cl. 217—15)

My invention relates to improvements in folding crates, particularly adapted for shipping eggs and other similar products.

The primary object of the invention is to provide a folding crate which when collapsed will occupy a minimum of space, so that it may be conveniently shipped from place to place.

A further object of the invention is to provide a crate of the above mentioned character which may be easily and quickly assembled for use or knockdown when not in use.

Another object of the invention is to provide a device of the above-mentioned character which is simple and durable in construction, reliable and efficient in use and inexpensive to manufacture.

Other objects and advantages of the invention will be apparent during the course of the following description.

In the accompanying drawings, forming a part of this specification and in which like numerals are employed to designate like parts throughout the same, Fig. 1 is a side elevation view of the crate, Fig. 2 is a longitudinal sectional view of the same, Fig. 3 is a top plan view with the top section removed, Fig. 4 is an end view, Fig. 5 is a cross section taken on lines 5—5 of Fig. 1, Fig. 6 is a perspective view of one corner of the crate showing the hinge connection between the end section and one of the side sections, Fig. 7 is a section taken on lines 7—7 of Fig. 6, Fig. 8 is a fragmentary perspective view of the connection between the top section and central partition, with the parts in separate relation, Fig. 9 is a section taken on lines 9—9 of Fig. 2, Fig. 10 is a perspective view of one of the side edges of the central partition, Fig. 11 is a sectional view through one of the separable connections, and, Fig. 12 is a front elevation view of the same.

In the drawings, wherein for the purpose of illustration, I have shown a preferred embodiment of my invention, the numeral 5 denotes the bottom section of the crate, 6 and 7 the side sections, 8 and 9 the end sections, 10 the central partition and 11 the top section. The end sections are connected to the ends of the side section 6, by hinges 12, fixedly attached thereto, so as to permit the end sections to fold inwardly, as shown in dotted lines in Fig. 3. The bottom section 5 at each end is provided with a hinge member 13 arranged transversely of the bottom and having one of its flaps 14 attached to the bottom. The other flap 15 of the hinge member is adapted to fold against the end sections and at spaced intervals is provided with longitudinal keyhole shaped slots 16 adapted to be engaged by the studs 17 projecting from the lower edge of the end sections, the studs having heads 18, for securing the studs in the restricted ends of the slots, thereby releasably locking the end and bottom sections together. The side section 7 at each end has hinge members 19 extending vertically thereof, one flap 20 of the members being fixedly secured to the side section and the other flap 21 being adapted to fold against the side edge of the end sections. The flap 21 is also provided with slots 16 adapted to be engaged by studs 17 projecting from the end sections, whereby the side section 7 and end sections are detachably secured together. A transverse partition 22 is disposed intermediate the ends of the bottom section 5 having its lower edge secured to the bottom by the hinge 23 fixedly secured to the bottom and partition. The side edges of the partition 22 have U-shaped metal strips fitted thereon having at spaced intervals transverse slots 24 opening through one side of the strips, as at 25, adapted to receive the studs 26 projecting from the side sections, whereby the side sections and partition are joined together. The top section 11 at each end is provided with hinge members 27 extending transversely thereof, one flap 28 of the members being fixedly secured to the top section and the other flap 29 being adapted to fold against the upper edge of the end members 8 and 9. The flap 29 is also provided with slots 16 adapted to be engaged by studs 17 projecting from the end members, whereby the top and end members are detachably secured together. The top edge of the partition 22 has a metal strip 30 secured thereon having at spaced intervals keyhole slots 31 adapted to be engaged by the studs 32 depending from the top section 11, whereby the top section and partition are detachably secured together.

To assemble, the end sections 8 and 9 are swung outwardly from the side section 6 and then the bottom section 5 is connected with the end sections by engaging the studs 17 projecting from the lower edge of the end sections with the slots 16 provided in the flap 15 of the hinge member 13. After the studs are engaged with the slots the bottom section is slid to move the studs into the restricted ends of the slots locking the bottom and end sections together. The side section 7 is then placed against the side edges of the end sections and the flaps 21 of the hinge members 19 swung against the end sections, so that the studs 17 engage in the slots 16 provided in the flaps 21. The side section 7 is then pushed downwardly so the studs are disposed in the restricted end of the slots locking the side section and end sections together. After the bottom and side section have been connected to the end sections, the partition 22 is swung upwardly until the studs 26 engage in the slots 24 and then the top section is ready to be applied. The top is positioned so that the studs 32 engage in the slots 31 provided in the top edge of the partition 22 and the flaps 29 of the hinge members 27 are swung against the end sections so that the studs 17 engage in the slots 16 of the flaps 29. Upon sliding the top slightly the studs 17 and 32 are brought into engagement with the restricted ends of the slots locking the top section, partition and end sections together. If desired a suitable lock may be provided for securing the top in its locked position.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. A shipping crate comprising a plurality of sections, studs projecting from certain of said sections, hinge members secured to other sections having one flap provided with keyhole slots adapted to receive said studs, a central partition hingedly connected at one edge to one of said sections and provided with slots in its free edges and studs extending from the sections adjacent the free edges of said partitions adapted to engage in the slots of said partition.

2. A shipping crate comprising a side section, end sections hingedly connected to said side section, a bottom and side section, hinge members at the ends thereof having one flap provided with keyhole slots adapted to receive studs projecting from said end members, a partition hingedly connected to said bottom section intermediate its ends, said partition having slots in its side edges adapted to receive studs projecting from the side sections, a top section having studs adapted to engage slots in the top edge of said partition, and hinge members attached to the ends of said top section having flaps provided with keyhole slots adapted to receive studs projecting from said end sections.

ADELINE M. MATZ.